United States Patent
Miyamoto et al.

(10) Patent No.: US 8,742,318 B2
(45) Date of Patent: Jun. 3, 2014

(54) TOOL LENGTH MEASURING METHOD AND TOOL LENGTH MEASURING DEVICE

(75) Inventors: Satoshi Miyamoto, Nabari (JP); Takayuki Nishioka, Sakurai (JP)

(73) Assignee: DMG Mori Seiki Co., Ltd., Yamatokoriyama (JP)

(*) Notice: Subject to any disclaimer, the term of this patent is extended or adjusted under 35 U.S.C. 154(b) by 310 days.

(21) Appl. No.: 13/179,425

(22) Filed: Jul. 8, 2011

(65) Prior Publication Data
US 2012/0085893 A1 Apr. 12, 2012

(30) Foreign Application Priority Data
Jul. 8, 2010 (JP) .................................. 2010-156106

(51) Int. Cl.
*G06M 7/00* (2006.01)

(52) U.S. Cl.
USPC ............ 250/221; 356/485; 356/492; 356/496

(58) Field of Classification Search
USPC ............... 250/221, 222.1; 356/908, 482, 485, 356/492, 496; 340/555–557
See application file for complete search history.

(56) References Cited

U.S. PATENT DOCUMENTS

| | | | |
|---|---|---|---|
| 7,025,544 B2 * | 4/2006 | Sugata et al. | ................. 409/136 |
| 2013/0320200 A1 | 12/2013 | Egglestone et al. | |

FOREIGN PATENT DOCUMENTS

| | | | |
|---|---|---|---|
| JP | 6-344247 A | 12/1994 |
| JP | 7-031254 A | 2/1995 |
| JP | 10-138097 A | 5/1998 |
| JP | 2010-526287 A | 7/2010 |
| WO | 2008/135744 A1 | 11/2008 |

* cited by examiner

*Primary Examiner* — Francis M Legasse, Jr.
(74) *Attorney, Agent, or Firm* — Smith Patent Office

(57) ABSTRACT

In a tool length measuring method measuring a length of a tool based on a movement amount of the tool from a predetermined position when the tool is moved from the predetermined position in a predetermined direction and interrupts a laser beam, the movement of the tool in a direction in which the tool approaches a main body of a laser device is stopped when a static signal indicating that the tool is interrupting the laser beam is detected.

2 Claims, 7 Drawing Sheets

TOOL LENGTH MEASURING METHOD AND TOOL LENGTH MEASURING DEVICE

BACKGROUND OF THE INVENTION

1. Field of the Invention

The present invention relates to a measuring method and a measuring device measuring a tool length based on a movement amount of a tool when the tool is moved from a predetermined position in a predetermined direction and interrupts a laser beam.

2. Description of the Related Art

As a conventional device measuring a tool length by a laser beam, Japanese Patent Application Laid-open No. Hei 10-138097, for example, discloses a device which emits a laser beam from its light projector toward its light receiver and calculates the tool length based on a coordinate value when the tool interrupts the laser beam.

SUMMARY OF THE INVENTION

In the conventional tool length measuring device, when the tool interrupts the laser beam, a skip signal indicating that the tool has shifted from a state where the tool does not interrupt the laser beam to a state where the tool interrupts the laser beam is input to a program controller. When the skip signal is input, the program controller immediately stops the movement of the tool and continues a tool length measuring program.

In the conventional measurement of the tool length, the tool is sometimes gradually moved while an operator repeats the vertically downward movement of the tool and the pause of this movement by his/her manual operation. In this case, if a pause instruction is given when the tool is at a position just before interrupting the laser beam, the tool slightly moves down due to an inertia, though it should stop as a machine, and interrupts the laser beam, so that the skip signal is output. While the pause function is working, program control is not executed and therefore the skip signal is not read. Therefore, when the operator gives a movement command next, the tool moves by an amount designated by the operator even though it is interrupting the laser beam, which raises a concern about a problem that the tool may come into contact with or collide with a main body of a laser device.

It is an object of the present invention to provide a tool length measuring method and a tool length measuring device capable of surely stopping the movement of a tool even when a skip signal is not read.

An invention of the present application is a tool length measuring method measuring a length of a tool based on a movement amount of the tool from a predetermined position when the tool is moved from the predetermined position in a predetermined direction and interrupts a laser beam, the method including stopping the movement of the tool in a direction in which the tool approaches a main body of a laser device when detecting a first signal (static signal) indicating that the tool is interrupting the laser beam.

Another invention of the present application is a tool length measuring device measuring a length of a tool based on a movement amount of the tool from a predetermined position when the tool is moved from the predetermined position in a predetermined direction and interrupts a laser beam, the device including: a main body of a laser device including a laser beam generating part generating the laser beam, a laser beam receiving part receiving the laser beam generated by the laser beam generating part, and a first signal output part outputting a first signal indicating that the tool is interrupting the laser beam; and a program controller stopping the movement of the tool in a direction in which the tool approaches the main body of the laser device when detecting the first signal.

According to the invention of the present application and the other invention of the present application, when the first signal (static signal) indicating that the tool is interrupting the laser beam is detected, the movement of the tool in the direction in which the tool approaches the main body of the laser device is stopped, and therefore, even when a skip signal indicating that the tool has shifted from a state where it does not interrupt the laser beam to a state where it interrupts the laser beam is not read because a pause instruction is given when the tool is at a position immediately before interrupting the laser beam, it is possible to stop the movement of the tool toward the main body of the laser device, which can prevent the tool from coming into contact with or colliding with the main body of the laser device.

In a preferable embodiment of the invention of the present application, when a second signal (skip signal) which is output when the tool shifts from a state where the tool does not interrupt the laser beam to a state where the tool interrupts the laser beam is detected, a tool length measuring program is continued, and the first signal is output later than the second signal.

In a preferable embodiment of the other invention of the present application, the main body of the laser device further includes a second signal output part outputting a second signal when the tool shifts from a state where the tool does not interrupt the laser beam to a state where the tool interrupts the laser beam, and the first signal is output later than the second signal.

According to the above preferable embodiments, since the first signal (static signal) indicating that the tool is interrupting the laser beam is output later than the second signal (skip signal) indicating that the tool has interrupted the laser beam, the program controller is capable of surely reading the second signal and surely continuing the tool length measuring program.

Specifically, if the first signal is read earlier, a command for stopping the movement of the tool is output based on the first signal, so that the tool length measuring program cannot be continued, but in the present invention, since the first signal is output later, this problem can be avoided. Therefore, there is no influence on a normally used program, and when the second signal is not read due to the aforesaid special operation, the movement of the tool can be stopped based on the first signal.

DETAILED DESCRIPTION OF THE PREFERRED EMBODIMENTS

Figure 1:
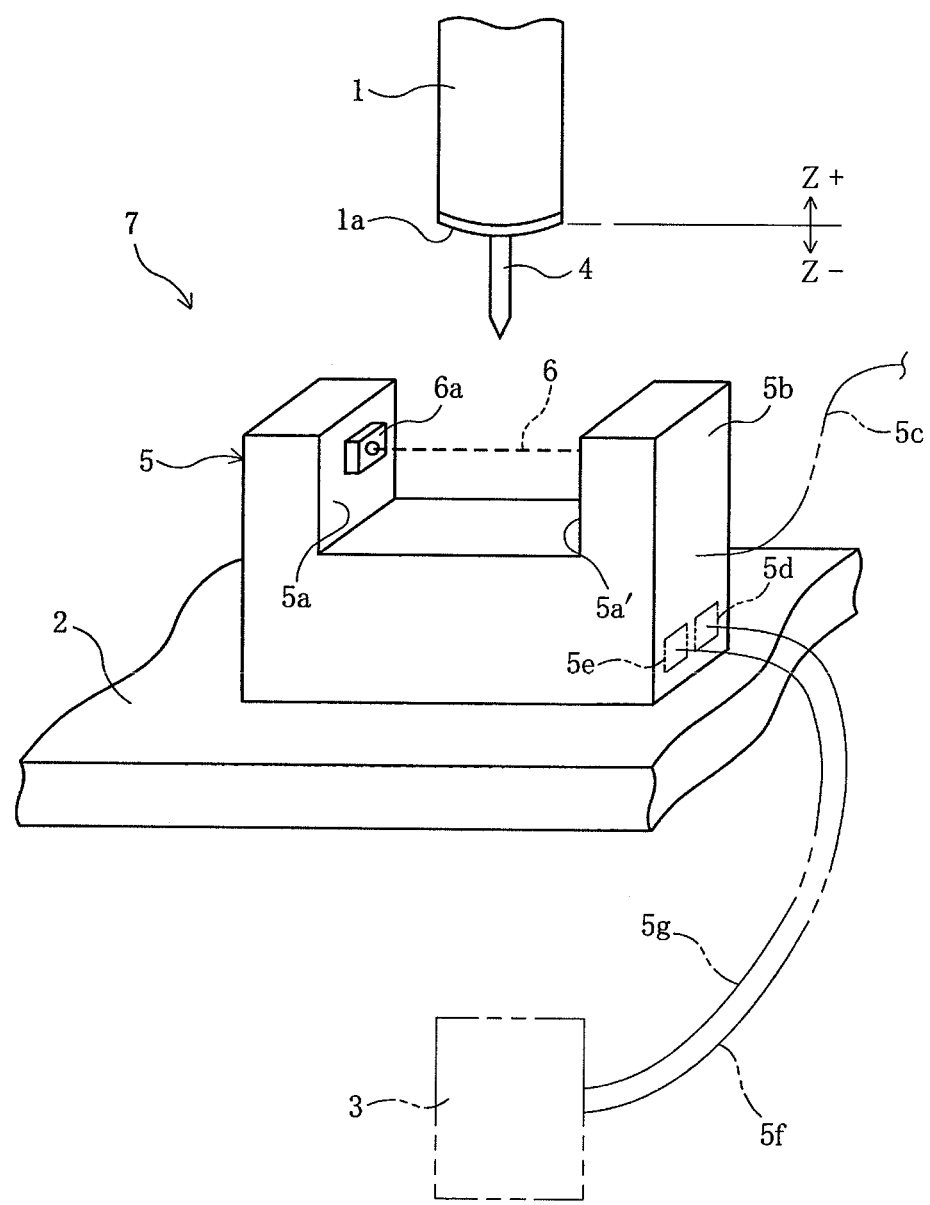
FIG. 1 is a front perspective view used to describe a tool length measuring method and a tool length measuring device according to an embodiment 1 of the present invention.

An embodiment of the present invention will be hereinafter described based on the attached drawings.

[Embodiment 1]

FIG. 1 to FIG. 7 are views used to describe a tool length measuring method and a tool length measuring device according to an embodiment 1 of the present invention.

In the drawings, 1 denotes a spindle of a machine tool, and a table 2 on which a workpiece (not shown) is placed is disposed under the spindle 1. The spindle 1 is movable in a Z-axis direction, and a tool 4 is loaded to a lower end portion of the spindle 1.

The machine tool of this embodiment further includes a tool length measuring device 7. The tool length measuring device 7 includes: a main body of a laser device 5 and a program controller 3 also serving as an NC controller of the machine tool.

The main body of the laser device 5 is formed in a concave block shape, and a generator 6a generating a laser beam 6 is disposed on its left inner wall 5a and a receiver 6b receiving the laser beam 6 is disposed on its right inner wall 5a'. Further, a power supply cable 5c is connected to an outer sidewall 5b of the main body of the laser device 5.

The main body of the laser device 5 further includes a skip signal output part 5d and a static signal output part 5e. The skip signal output part 5d outputs a skip signal (second signal) A indicating that the tool 4 has interrupted the laser beam 6, that is, a signal indicating a shift from a state where the laser beam 6 is not interrupted to a state where the laser beam 6 is interrupted. Further, the static signal output part 5e outputs a static signal (first signal) B indicating that the tool 4 is interrupting the laser beam 6, that is, a signal indicating that the state where the tool 4 is interrupting the laser beam 6 is continuing.

Figure 2:
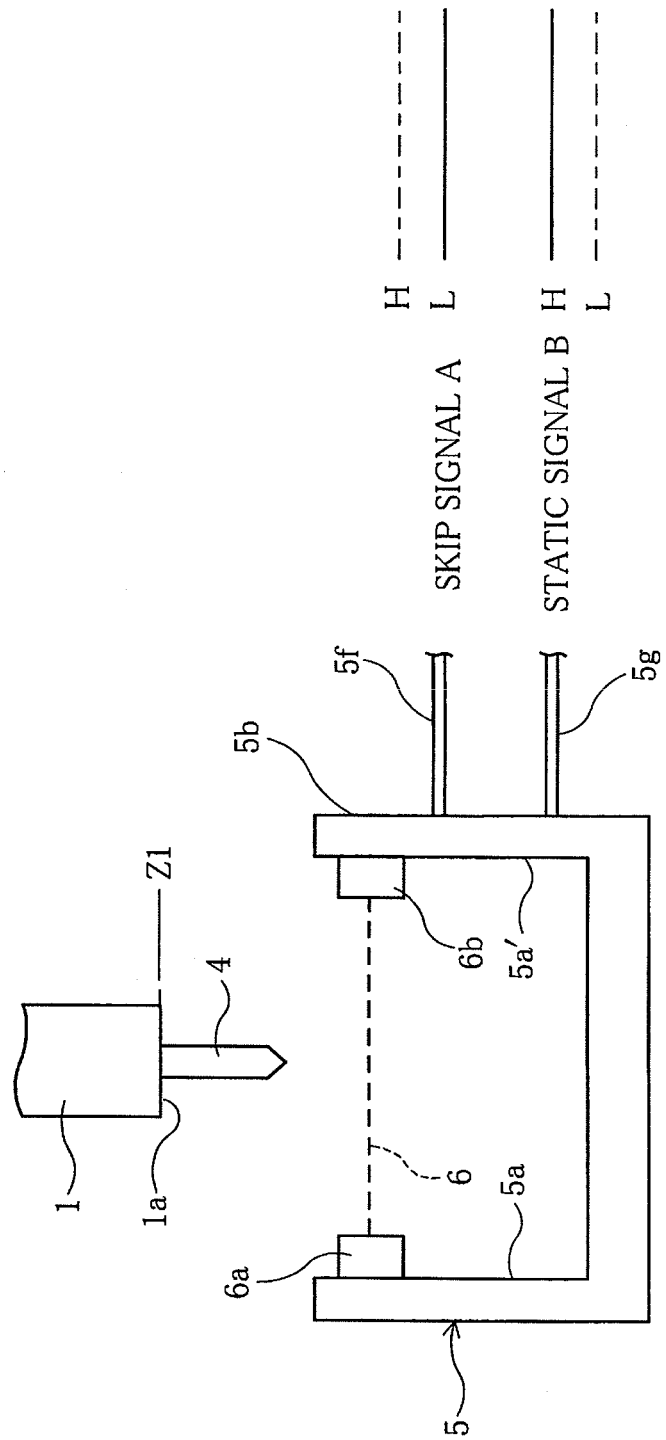
FIG. 2 is a front view when a tool is situated right above a main body of a laser device.
Figure 3:
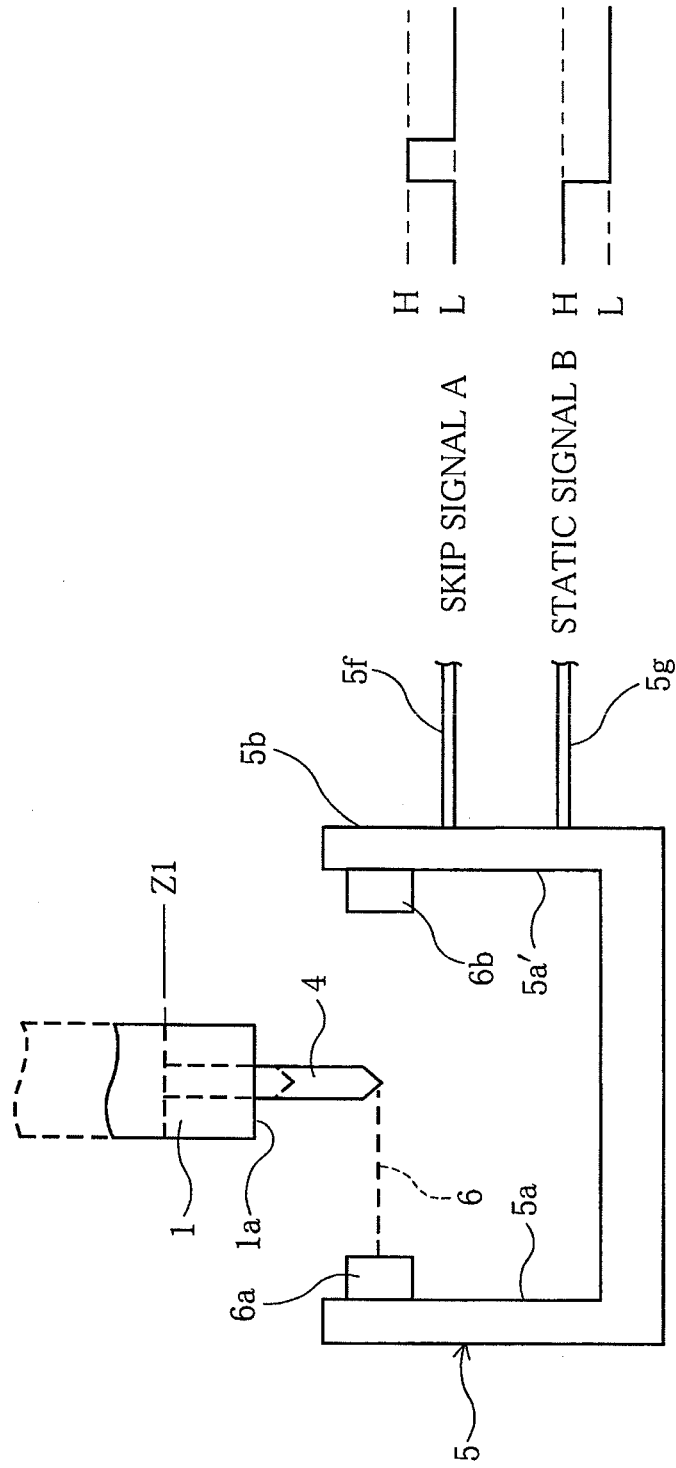
FIG. 3 is a front view when the tool interrupts a laser beam.
Figure 4:
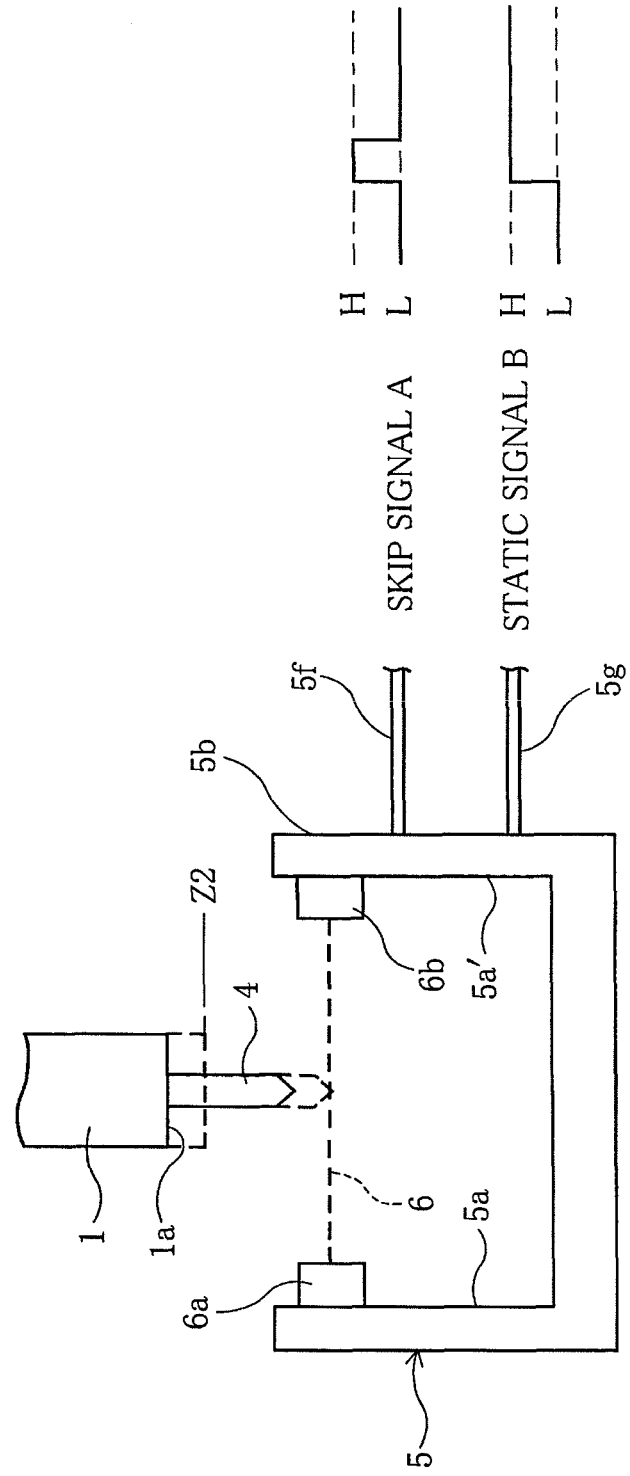
FIG. 4 is a front view when the tool moves up to a position where it does not interrupt the laser beam.
Figure 5:
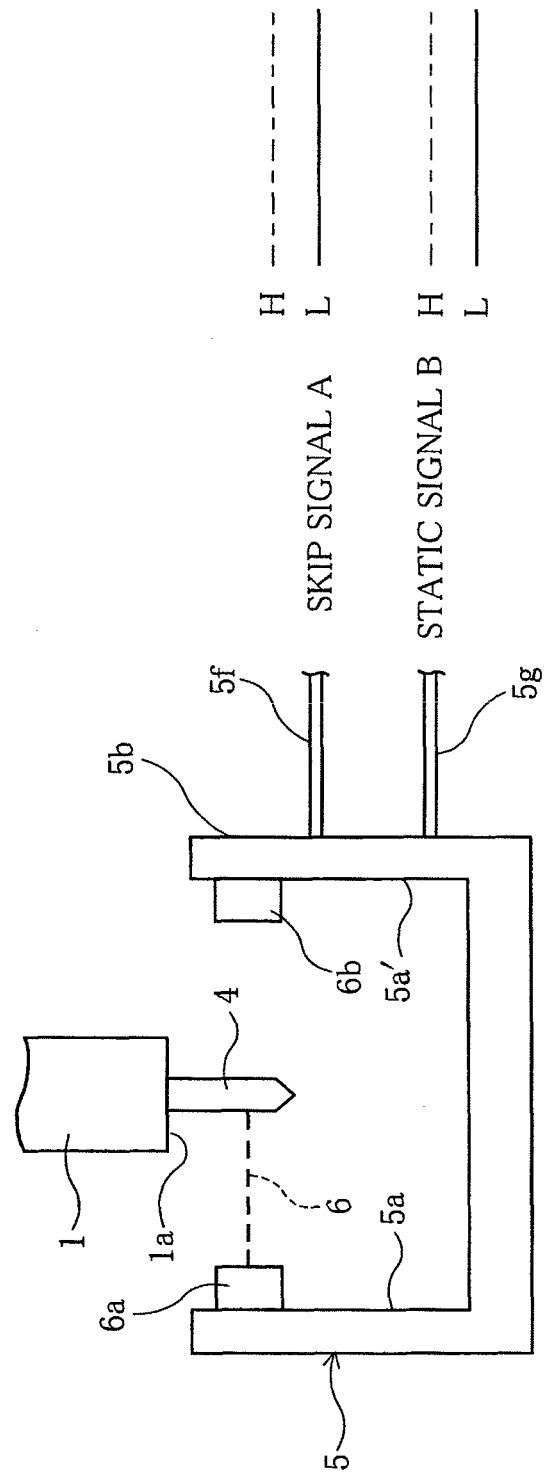
FIG. 5 is a front view when the tool is interrupting the laser beam.

The skip signal A is a rectangular wave of about 20 msec that maintains a low state in the state where the tool 4 does not interrupt the laser beam 6 (see FIG. 2), and changes to a high state when the tool 4 shifts from the state where it does not interrupt the laser beam 6 to the state where it interrupts the laser beam 6 (see FIG. 3). Therefore, only one skip signal A is output at an instant when the tool 4 interrupts the laser beam 6, and thereafter is not output even when the state where the tool 4 is interrupting the laser beam 6 continues. Incidentally, one skip signal A is also output when the tool 4 shifts from the state where it is interrupting the laser beam 6 to the state where it does not interrupt the laser beam (see FIG. 4).

On the other hand, an original purpose of the static signal B is to give the confirmation that the laser beam 6 is normally passing from the generator 6a to the receiver 6b in the main body of the laser device 5, by maintaining a high state (see FIG. 2). The static signal B changes to low in the state where the tool 4 is interrupting the laser beam 6, and maintains the low state while the state where the tool 4 is interrupting the laser beam 6 continues (see FIG. 3). Incidentally, after the tool 4 shifts to the state where it does not interrupt the laser beam 6, the static signal B maintains the high state (see FIG. 4).

The skip signal A and the static signal B are input to the program controller 3 via cables 5f, 5g respectively.

Figure 6:
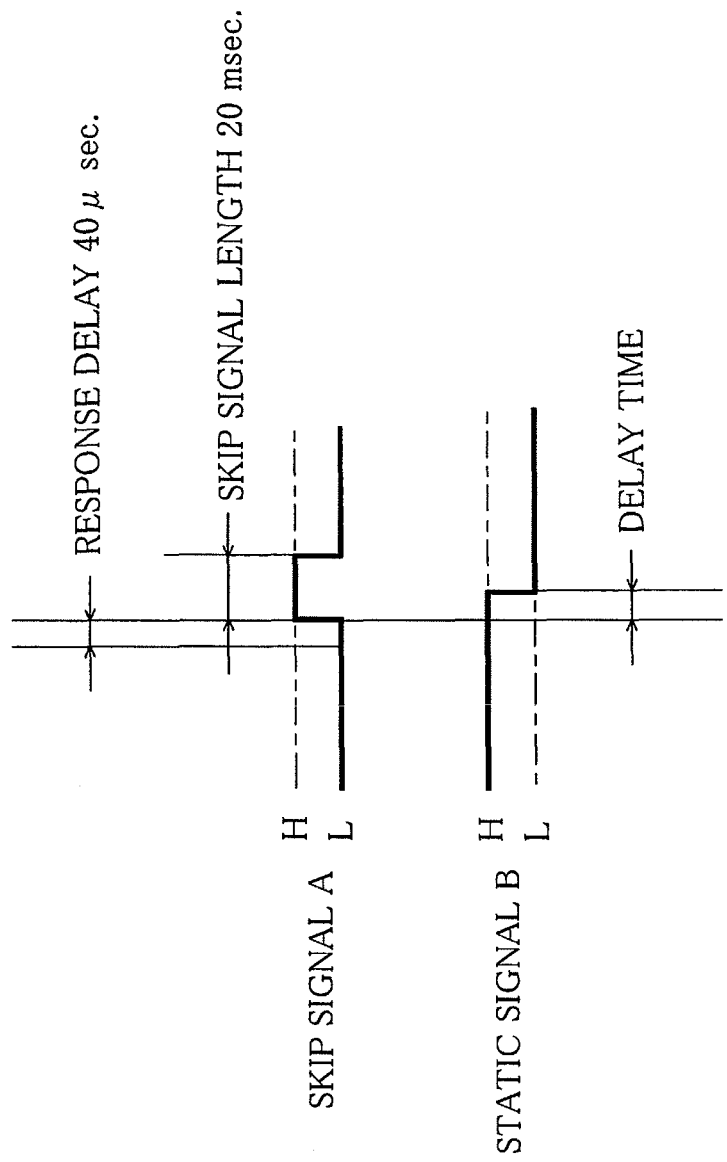
FIG. 6 is a timing chart of signals output from the main body of the laser device.

Here, as shown in FIG. 6, the skip signal A rises from low to high after a predetermined response delay time (for example 40 μsec) passes from an instant at which a tip of the tool 4 actually interrupts the laser beam 6, while the static signal B changes from high to low after a predetermined delay time passes from an instant at which the skip signal A rises.

Figure 7:
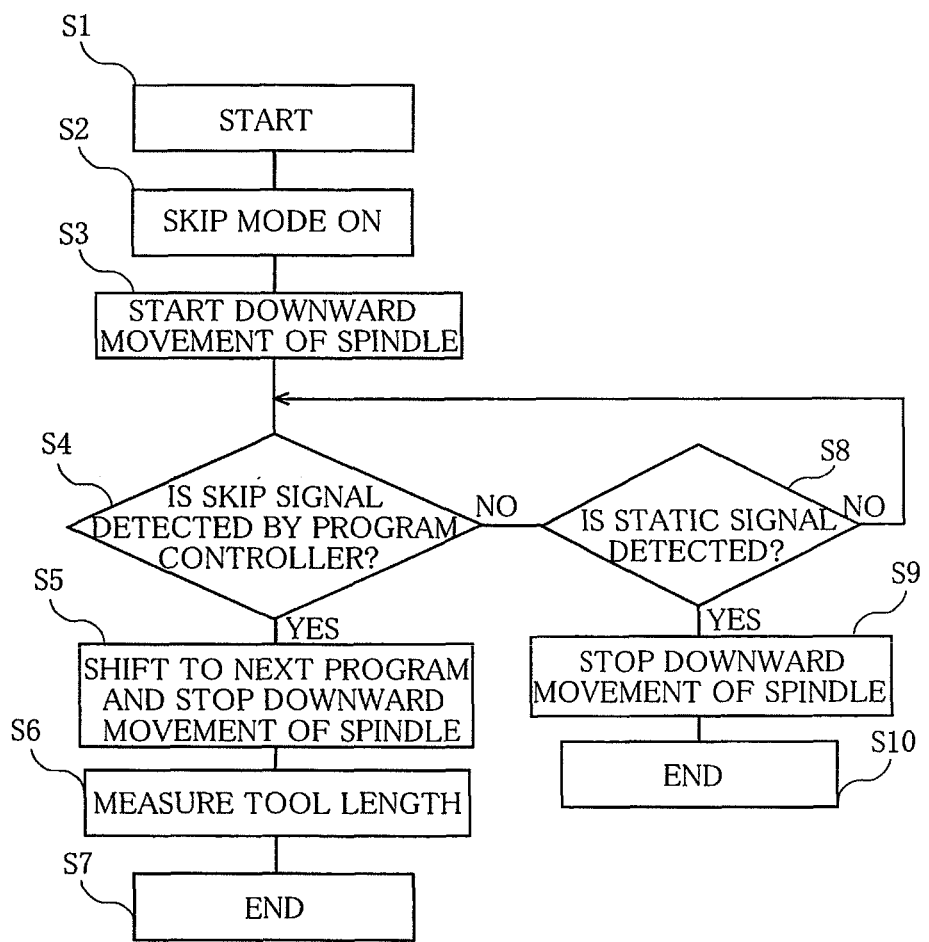
FIG. 7 is a flowchart showing a control operation in a tool length measuring program.

A tool length measuring operation in this embodiment 1 will be described mainly along with the flowchart in FIG. 7.

When a tool length measuring program starts, a skip mode is turned on, and a Z-axis coordinate Z1 of a lower end surface 1a of the spindle 1 is read (see FIG. 2), and subsequently, the downward movement of the spindle 1 is started (Steps S1 to S3).

Then, when the tip of the tool 4 interrupts the laser beam 6, the rectangular wave in the skip signal A is output, and after the predetermined delay time passes from this, the static signal B changes from high to low, and these signals are input to the program controller 3. When the skip signal A is detected in the program controller 3 (Step S4), the program controller 3 stops the downward movement of the spindle 1 (Step S5) and continues the tool length measuring program (Steps S6, S7).

Concretely, the program controller 3 moves the spindle 1 upward to a position where the tool 4 does not interrupt the laser beam 6, moves the spindle 1 again downward at a low speed, reads a Z-axis coordinate Z2 of the lower end surface 1a when the tool 4 interrupts the laser beam 6 (see FIG. 4), and finds a tool length based on the read Z-axis coordinate Z2 and so on.

On the other hand, when the skip signal A is not detected in the program controller 3 at Step S4 due to a special reason, for example, because a pause command is input immediately before the tool 4 interrupts the laser beam 6, and when the static signal B is detected (Step S8), the program controller 3 stops the tool length measuring program and also stops the downward movement of the spindle 1 (Steps S9, S10).

More concretely regarding the static signal B, it may be determined that the static signal B is detected, when the static signal B changes from high to low and the low state continues for a predetermined time, for example, a period of the rectangular wavelength (20 msec) of the skip signal A.

As described above, in the embodiment 1, when the skip signal A indicating that the tool 4 has interrupted the laser beam 6 is detected, the tool length measuring program is continued, and when the static signal B indicating that the tool 4 is interrupting the laser beam 6 is detected, the tool length measuring program is stopped and the movement of the tool 4 is stopped. Therefore, in a normal state, it is possible to execute the tool length measuring program without any problem, and even when the skip signal A is not detected because of some reason, a remaining movement amount of the tool 4 is cancelled, which makes it possible to prevent the tool 4 from coming into contact with or colliding with the main body of the laser device 5.

Further, the skip signal A is a rectangular wave as conventionally is, and as the static signal B serving as an emergency spindle movement stop signal, a signal conventionally employed for the confirmation that the main body of the laser device 5 is normally generating the laser beam 6 is used, which eliminates a need for any additional hardware remodeling of a conventional tool length measuring device. Therefore, it possible to prevent the tool 4 from coming into contact with or colliding with the main body of the laser device 5 while suppressing a cost increase.

Furthermore, since the static signal B indicating that the tool 4 is interrupting the laser beam 6 is output later than the skip signal A indicating that the tool 4 has interrupted the laser beam 6, the program controller 3 is capable of surely reading the skip signal A and surely continuing the tool length measuring program.

Specifically, if the static signal B is read first, a command for stopping the downward movement of the tool 4 is output based on the static signal B and the tool length measuring program cannot be continued. In the embodiment 1, on the other hand, since the static signal B is output later than the skip signal A, it is possible to avoid the problem that the tool length measuring program cannot be continued. Therefore, there is no influence on the normally used tool length measuring program, and when the skip signal A is not read due to the aforesaid special operation, it is possible to stop the movement of the tool 4 based on the static signal B, which can prevent the problem of breakage of the device.

In the above embodiment, it is described that the static signal is output later than the skip signal, and it should be noted that what this means include not only a case where the static signal itself is output later as described above but also a case where a timing at which the output static signal is read by the program controller is later than a timing at which the output skip signal is read by the program controller. That is, the same effect as that of the embodiment can be obtained also when the static signal and the skip signal are output concurrently and the program controller reads the skip signal first and the static signal later.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool length measuring method measuring a length of a tool based on a movement amount of the tool from a predetermined position when the tool is moved from the predetermined position in a predetermined direction and interrupts a laser beam, the method comprising stopping the movement of the tool in a direction in which the tool approaches a main body of a laser device when detecting a first signal indicating that the tool is interrupting the laser beam, wherein, when a second signal which is output when the tool shifts from a state where the tool does not interrupt the laser beam to a state where the tool interrupts the laser beam is detected, a tool length measuring program is continued, and wherein the first signal is output later than the second signal.

2. A tool length measuring device measuring a length of a tool based on a movement amount of the tool from a predetermined position when the tool is moved from the predetermined position in a predetermined direction and interrupts a laser beam, the device comprising: a main body of a laser device including a laser beam generating part generating the laser beam, a laser beam receiving part receiving the laser beam generated by the laser beam generating part, and a first signal output part outputting a first signal indicating that the tool is interrupting the laser beam; and a program controller stopping the movement of the tool in a direction in which the tool approaches the main body of the laser device when detecting the first signal, wherein the main body of the laser device further includes a second signal output part outputting a second signal when the tool shifts from a state where the tool does not interrupt the laser beam to a state where the tool interrupts the laser beam, and wherein the first signal is output later than the second signal.

* * * * *